United States Patent
Cheung et al.

(10) Patent No.: US 7,406,053 B2
(45) Date of Patent: *Jul. 29, 2008

(54) METHODS AND SYSTEMS FOR CONTROLLING THE NUMBER OF COMPUTATIONS INVOLVED IN COMPUTING THE ALLOCATION OF RESOURCES GIVEN RESOURCE CONSTRAINTS

(75) Inventors: Gene Cheung, Musashino (JP);
Wai-tian Tan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 666 days.

This patent is subject to a terminal disclaimer.

(21) Appl. No.: 11/011,938

(22) Filed: Dec. 13, 2004

(65) Prior Publication Data
US 2006/0126527 A1 Jun. 15, 2006

(51) Int. Cl.
*H04L 12/26* (2006.01)
(52) U.S. Cl. .......................... 370/252; 705/37
(58) Field of Classification Search ............ 370/230, 370/232, 231; 704/201, 225; 455/522
See application file for complete search history.

(56) References Cited

U.S. PATENT DOCUMENTS

| | | | |
|---|---|---|---|
| 6,301,267 B1 * | 10/2001 | Ben-Ami | 370/468 |
| 6,424,624 B1 * | 7/2002 | Galand et al. | 370/231 |
| 6,493,331 B1 * | 12/2002 | Walton et al. | 370/341 |
| 6,721,270 B1 * | 4/2004 | Mitra et al. | 370/230 |
| 6,928,053 B1 * | 8/2005 | Kadengal | 370/232 |
| 7,068,660 B2 * | 6/2006 | Suni | 370/395.2 |
| 7,072,295 B1 * | 7/2006 | Benson et al. | 370/230 |
| 7,096,034 B2 * | 8/2006 | Zhang et al. | 455/522 |
| 2003/0061362 A1 * | 3/2003 | Qiu et al. | 709/229 |
| 2003/0152151 A1 * | 8/2003 | Hsieh et al. | 375/240.26 |
| 2004/0044522 A1 * | 3/2004 | Yang et al. | 704/201 |
| 2004/0141508 A1 * | 7/2004 | Schoeneberger et al. | 370/401 |
| 2005/0228658 A1 * | 10/2005 | Yang et al. | 704/225 |
| 2006/0041502 A1 * | 2/2006 | Blair et al. | 705/37 |

* cited by examiner

*Primary Examiner*—Thong H Vu

(57) ABSTRACT

Methods and systems for controlling the number of computations involved in computing the allocation of resources given resource constraints. According to one embodiment, a set of existing constraints for providing the resources is received. An adjustable parameter for reducing the number of computations is received. A complexity-scalable resource-allocator is executed where the complexity-scalable resource-allocator computes an estimated constraint for providing a resource, at least in part, by dividing an existing constraint for providing the resource by the adjustable parameter, rounding down, and multiplying by the adjustable parameter, wherein the estimated constraint is used to optimally allocate the resources.

25 Claims, 17 Drawing Sheets function Sum $(i, R_0, R_1)$ 1. if ($DPsum[i, R_0, R_1]$ is filled)  // DP case
2. { return $DPsum[i, R_0, R_1]$; }
3. if ($R_0 < 0$) or ($R_1 < 0$)  // base case 1
4. { return $-\infty$; }
5. if ($i = 1$)  // base case 2
6. { $s_0 := \max_{q \in \{Q \mid c(q)r_{1,1} \leq R_0\}} P0(q, r_1, 1)$;
7. $s_1 := \max_{q \in \{Q \mid c(q)r_{1,1} \leq R_1\}} P1(q, r_1, 1)$;
8. return $\max(s_0, s_1)$;
9. }
10. $S := 0$  // recursive case
11. for each $j$ such that $e_{i,j} \in \mathcal{E}$,
12. { for each $q \in Q$,
13.   { $s_0 := Sum(i-1, R_0-c(q)r_{i,j}, R_1) +$
       $p_0(q, r_{i,j}) Prod(j, i-1, R_0-c(q)r_{i,j}, R_1)$;
14.   { $s_1 := Sum(i-1, R_0, R_1-c(q)r_{i,j}) +$
       $p_1(q, r_{i,j}) Prod(j, i-1, R_0, R_1-c(q)r_{i,j})$;
15.   $s := \max(s_0, s_1)$;
16.   $t := (s_0 > s_1)\ ?\ 0 : 1$;
17.   if ($s > S$)
18.   { $(S, X, Y, Z) := (s, q, j, t)$; }
19. } }
20. $(DPsum[i, R_0, R_1], DPqos[i, R_0, R_1]) := (S, X)$;
21. $(DPind[i, R_0, R_1], DPpath[i, R_0, R_1]) := (Y, Z)$;
22. return $S$;

FIG. 6

```
function Prod(j,i,R_0,R_1)
1.  if ( R_0 < 0 ) or ( R_1 < 0 )                                                    // base case 1
2.  { return 0; }
3.  if ( j = i = 1 )                                                                 // base case 2
4.  { return DPsum[1, R_0, R_1]; }
5.  ( X, Y ) := ( DPqos[i,R_0,R_1], DPind[i,R_0, R_1] );
6.  if ( j < i )                                                                     // recursive case
7.  { if ( DPpath[i,R_0,R_1] = 0 )
8.      { P := Prod(j,i -1, R_0, R_1 - c(X)r_{i,Y}, R_1); }
9.      else
10.     { P := Prod(j,i - 1, R_0,R_1 - c(X)r_{i,Y}); }
11. }
12. else                                                                             // j = i
13. { if ( DPpath[i,R_0,R_1] = 0 )
14.     { P := p_0(X.r_{i,Y}) = Prod(Y.i-1.R_0 - c(X)r_{i,Y},R_1); }
15.     else
16.     { P := p_1(X,r_{i,Y}) = Prod(Y.i -1.R_0.R_1 -c(X)r_{i,Y}); }
17. }
18. return P;
```

FIG. 7

13. $s_0 := Sum(i\text{-}1, R_0 - \left\lceil \dfrac{c(q)\, r_{i,j}}{K_{DR}} \right\rceil, R_1) +$ $p0(q, r_{i,j})\, Prod(j, i\text{-}1, R_0 - \left\lceil \dfrac{c(q)\, r_{i,j}}{K_{DR}} \right\rceil, R_1)\,;$ 14. $s_1 := Sum(i\text{-}1, R_0, R_1 - \left\lceil \dfrac{c(q)\, r_{i,j}}{K_{DR}} \right\rceil) +$ $p1(q, r_{i,j})\, Prod(j, i\text{-}1, R_0, R_1 - \left\lceil \dfrac{c(q)\, r_{i,j}}{K_{DR}} \right\rceil)\,;$

FIG. 8A

8. $P := Prod(j, i-1, R_0 - \left\lceil \frac{c(X) r_{i,Y}}{K_{DR}} \right\rceil, R_1)$ ;

10. $P := Prod(j, i-1, R_0, R_1 - \left\lceil \frac{c(X) r_{i,Y}}{K_{DR}} \right\rceil)$ ;

14. $P := p0(X, r_{i,Y}) * Prod(Y, i-1, R_0 - \left\lceil \frac{c(X) r_{i,Y}}{K_{DR}} \right\rceil, R_1) +$ 16. $P := p1(X, r_{i,Y}) * Prod(Y, i-1, R_0, R_1 - \left\lceil \frac{c(X) r_{i,Y}}{K_{DR}} \right\rceil)$ ;

FIG. 8B

13. $s_0 := Sum(i-1, R_0 - K_{IR} \left\lceil \dfrac{c(q)\, r_{i,j}}{K_{IR}} \right\rceil, R_1) +$ $p0(q, r_{i,j})\, Prod(j, i-1, R_0 - K_{IR} \left\lceil \dfrac{c(q)\, r_{i,j}}{K_{IR}} \right\rceil, R_1);$ 14. $s_1 := Sum(i-1, R_0, R_1 - K_{IR} \left\lceil \dfrac{c(q)\, r_{i,j}}{K_{IR}} \right\rceil) +$ $p1(q, r_{i,j})\, Prod(j, i-1, R_0, R_1 - K_{IR} \left\lceil \dfrac{c(q)\, r_{i,j}}{K_{IR}} \right\rceil);$

FIG. 8C

8. $P := Prod(j, i-1, R_0 - K_{IR} \left\lceil \dfrac{c(X) r_{i,Y}}{K_{IR}} \right\rceil, R_1)$ ;

10. $P := Prod(j, i-1, R_0, R_1 - K_{IR} \left\lceil \dfrac{c(X) r_{i,Y}}{K_{IR}} \right\rceil)$ ;

14. $P := p0(X, r_{i,Y}) * Prod(Y, i-1, R_0 - K_{IR} \left\lceil \dfrac{c(X) r_{i,Y}}{K_{IR}} \right\rceil, R_1)$;

16. $P := p1(X, r_{i,Y}) * Prod(Y, i-1, R_0, R_1 - K_{IR} \left\lceil \dfrac{c(X) r_{i,Y}}{K_{IR}} \right\rceil)$ ;

FIG. 8D

METHODS AND SYSTEMS FOR CONTROLLING THE NUMBER OF COMPUTATIONS INVOLVED IN COMPUTING THE ALLOCATION OF RESOURCES GIVEN RESOURCE CONSTRAINTS

RELATED APPLICATIONS

This Application is related to U.S. patent application, Ser. No. 10/613,601 by Gene Cheung and Wai-tian Tan, filed on Jul. 3, 2003 and entitled "Methods and Systems For Transporting Streaming Media Transmissions", assigned to the assignee of the present invention and incorporated herein by reference as background material.

TECHNICAL FIELD

The present invention relates generally to allocation of resources and more specifically to controlling the complexity of allocation of procedures involved by computing alternative constraints for allocation of resources.

BACKGROUND

The transport of streaming media is an important means of communicating information and data. Information of many types may be communicated in this manner including audio, video and text. Providers of streaming media content transmit the content to receivers (e.g., computer, television etc.) that are often operated by end users.

An issue confronted by streaming media content providers is the optimization of the encoding and/or transport of standard-compliant video streams over lossy networks for real-time playback. Factors that impact the optimization of encoding and transmission of streaming media include available computing resources for the optimization process, and the characteristics of transmission source and network. Optimization for streaming media delivery typically involves choosing an appropriate set of discrete parameters for the encoding of media material and/or the transport of the encoded media. The set of chosen parameters often has to satisfy additional constraints, such as a total transmission bit budget. This is difficult because a large number of parameters are involved for both media source and channel, and there is a substantial interdependency of these parameters.

For general discrete parameter optimization with constraints, there are two basic approaches to choosing the right parameter set: a primal approach where the original constrained problem is solved directly, and a dual approach where the constrained problem is first transformed to an easier associated unconstrained problem. Exhaustive parameter set search is one instance of the first approach, while the Lagrangian approach is one instance of the second approach. Both approaches have been used in various forms as a means of solving the network streaming media problem outlined above.

The most straightforward instance of the primal approach for choosing the best set of parameters is through an exhaustive search. By enumerating every single available possibility, one can guarantee the identification of the optimal solution in bounded time. However, such a solution is prohibitively expensive and inefficient. For example, with 20 parameters each assuming 10 possible values, the number of cases that must be enumerated using exhaustive search techniques is $10^{20}$ which is equal to 100×1 billion×1 billion.

In the second dual approach such as Lagrangian, instead of directly evaluating the different cases, the original constrained problem is approximated by a corresponding unconstrained problem where penalty function(s) are added to the objective function of the original problem. While generally faster than the primal approach, as unconstrained problems are usually easier to solve than contrained problems, dual approach like the Lagrangian relaxation has two important drawbacks that limit their applications for streaming media applications. First, dual approaches using penalty functions will converge to a good answer only when some additional assumptions on the characteristics of the objective function and/or the penalty functions are met which generally limit its application. Second, there is no easy way to select a good penalty function, and iteratively searching for one means no bound on how fast the solutions converge. Specifically, given a desired amount of computation, the quality of the solution cannot be determined a priori. Conversely, given a desired quality of solution, the amount of computation cannot be determined a priori.

Dynamic programming is a very efficient and structured technique to efficiently perform exhaustive search for many optimization problems. It is not generally applicable to all optimization problems, but is relevant to many problems, such as streaming media. There are two important characteristics of dynamic programming. First, since all possible combinations are considered in a structured manner, dynamic programming guarantees the optimal set of parameters in bounded time. Second, it is possible to terminate a dynamic programming optimization at any time, and the best set of parameters that has been evaluated to-date will be available. Nevertheless, it is generally impossible to determine the quality of the parameters obtained by a terminated dynamic programming procedure to the optimal set of parameter.

SUMMARY OF THE INVENTION

Methods and systems for controlling the number of computations involved in computing the allocation of resource given resource constraints. According to one embodiment, a set of existing constraints for providing the resources is received. An adjustable parameter for reducing the number of computations is received. A complexity-scalable resource-allocator is executed where the complexity-scalable resource-allocator computes an estimated constraint for providing a resource, at least in part, by dividing an existing constraint for providing the resource by the adjustable parameter, rounding down, and multiplying by the adjustable parameter, wherein the estimated constraint is used to optimally allocate the resources.

BRIEF DESCRIPTION OF THE DRAWINGS

The accompanying drawings, which are incorporated in and form a part of this specification, illustrate embodiments of the invention and, together with the description, serve to explain the principles of the invention.

FIGS. 6, 7 depict pseudo-code for a procedure for complexity scaled resource allocation, according to one embodiment of the present invention.

FIGS. 8A-8D depict pseudo-code that can be used as a part of the complexity scaled resource allocation, according to one embodiment of the present invention.

DETAILED DESCRIPTION OF THE INVENTION

Figure 1:
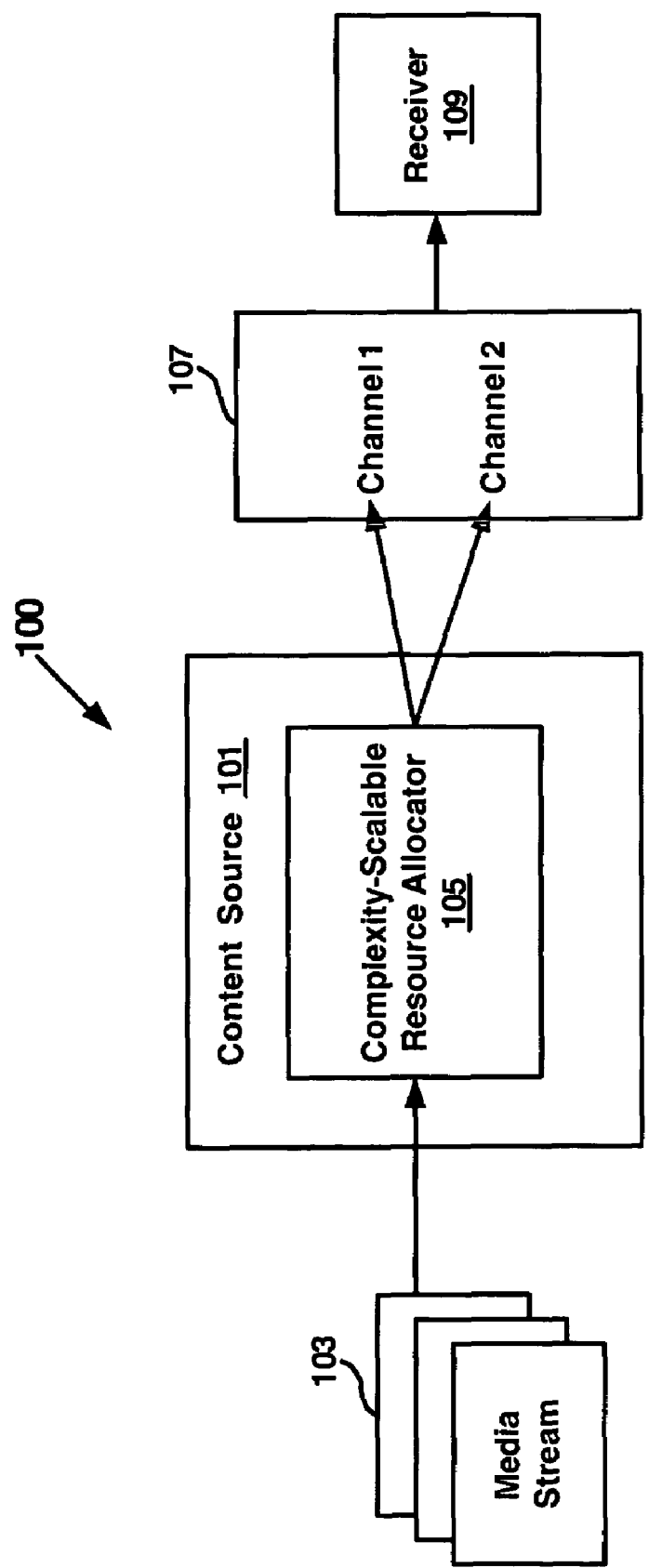
FIG. 1 shows a block diagram of a streaming media transmission and receiving topology according to one embodiment of the present invention.

Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well known methods, procedures, components, and circuits have not been described in details as not to unnecessarily obscure aspects of the present invention.

Exemplary Streaming Media Transmission System In Accordance With Embodiment Of The Present Invention New video coding standards, such as H.264, offer many coding flexibilities for better coding and streaming performance. One of these flexibilities is flexible motion-estimation support or reference frame selection (RFS), where each predicted frame can choose among a number of frames for motion estimation. Often at the cost of lower coding efficiency, the ability to choose among multiple frames in the past for motion estimation can potentially avoid error propagation due to packet loss.

Given the available RFS feature of video coding, the reference frame selection can be tailored for a given network streaming scenario. An example of a network streaming scenario can involve multi-path streaming over QOS networks.

QOS networks frequently provide network layer QOS support, where Internet Protocol (IP) packets experience different packet loss rates at different service classes and different costs per packet. A different cost constraint can be associated with each transmission path. For networks without network-level QOS, such as the Internet, end hosts can mimic a QOS network, for example, by applying forward error correction (FEC) of different strengths to different groups of packets. In this case, a different transmission rate constraint can be associated with each transmission path.

Multi-paths can be defined as two (or more) delivery paths that are simultaneously available to end hosts for packet delivery during a streaming session. For wired networks, multi-paths can be made available, for example, as a result of application induced overlay routing or network supported source-based routing. For wireless networks, mobile terminals can conceivably be connected to two nearest base-stations via multiple antennas, or simultaneously using two network interfaces into two orthogonal wireless technologies such as wireless local area network (LAN) and 3G wireless networks. Multi-paths can potentially be used for larger combined transmission rate in the case where each path is rate constrained. With regards to fault tolerance where paths are disjoint and possess different and uncorrelated loss characteristics, the simultaneous failure of both paths is less likely than a single path scenario.

According to one embodiment, given the described RFS feature of video coding and the network streaming scenario under consideration for each predicted frame in a to-be-encoded video sequence, a determination can be made as to how to (i) select an appropriate reference frame for motion estimation, and (ii) a QOS level and transmission path for packet delivery, such that the overall streaming performance is optimized. To this end, standard Lagrangian based optimization procedures can be employed. Nevertheless, there is no general mechanisms used by conventional systems to simultaneously bound the running time of a Lagrangian optimization and bound the worst-case approximation error. As a result, to date, there have been practical challenges in using conventional optimization schemes for low-latency, quality-guaranteed media delivery, for example. According to embodiments of the present invention, an alternative optimization strategy is provided, based on advanced integer rounding techniques, for example, that can provide a complexity and worst-case error bounded algorithm. Moreover, the proposed algorithm is complexity scalable, according to one embodiment, where the quality of the obtained approximate solution can be traded off with the algorithm's running time.

FIG. 1 shows a block diagram of a streaming media transmission and receiving topology 100, according to one embodiment of the present invention. According to exemplary embodiments, an optimization of the encoding and/or transmission of streaming media is facilitated by selecting the appropriate manner of encoding the streaming media that is to be transmitted and by selecting the appropriate channel for the actual transmission of the media stream. FIG. 1 shows a content source 101 (also commonly known as a "media content transmission source," "content server," "media outlet", etc), media stream (e.g., resource) 103, a complexity-scalable resource-allocator 105, a channel (e.g., path) 107 for transmitting the media stream 103 over, and a receiver (e.g., client) 109 that receives the media stream 103.

A content source 101 (e.g., content server, media outlet etc.) processes raw or compressed media content 103 and communicates the result to a receiver 109 through a channel 107. Examples of a content source 101 include a complexity-scalable resource-allocator (e.g., 105 discussed below) which directs the optimized transmission from source to receiver of encoded streaming media components (e.g., packet etc.). If media stream 103 includes raw media content (e.g. raw video, audio, text, etc.) the complexity-scalable resource-allocator 105 is involved in making joint decisions of optimized encoding and the choice of transport, according to one embodiment. If the media stream 103 includes compressed media content, the complexity-scalable resource-allocator 105 is involved in either making transport decisions only, or joint transcoding/transport decisions, according to another embodiment. It should be appreciated that the media content source 101 can accommodate either raw or compressed media content 103.

The media stream 103 can include media that is processed by the content source 101. The complexity-scalable resource-allocator 105 can select the manner in which components of the media stream 103 are encoded and/or the channel 107 over which the encoded components are transmitted. As previously mentioned, the media stream 103 may include either raw or compressed content portions.

The complexity-scalable resource-allocator 105 can direct the optimized transmission from source 101 to receiver 109 of encoded streaming media components. The complexity-scalable resource-allocator 105 can select the appropriate encoding process for the streaming media 103 that is to be transmitted and selects an appropriate channel 107 for the actual transmission of the encoded media stream. It should be appreciated that these selections are based on ascertained source and channel characteristics, as will be described in more detail hereinafter. By appropriately selecting the encoding process and streaming media transmission channel the quantity of media stream components that are delivered successfully to the receiver 109 are maximized thereby providing an optimized transmission result. According to one embodiment the functionality of the complexity-scalable resource-allocator 105 may be implemented by means of an algorithm, as will be described in more detail hereinafter, whose instructions are executed by means of an associated computing component (e.g. processor, ASIC etc.).

Media transmission channels 107 support the transmission of streaming media 103 from a content source (e.g., 101) to a client (e.g., 109). Individual transmission channels may be more or less desirable than other individual transmission channels as a means of transmitting a given streaming media component. The desirability of a transmission channel as a means for transmitting streaming media is related to channel characteristics. According to one embodiment, the complexity-scalable resource-allocator 105 can select the transmission channel that is most desirable for transmission based on ascertained channel characteristics. It should be appreciated that the capacity to select the best transmission channel for transmitting a given media component can provide a substantial improvement in the performance of a transmitting system.

The receiver 109 can receive streaming media 103 that originate from a content source 101. According to exemplary embodiments, the receiver can include any destination that is capable of receiving streaming media 103. Streaming media 103 can be optimized by maximizing the number of frames that are correctly decoded at the receiver 109. As previously mentioned this optimization can be achieved by an appropriate selection of reference frames and transmission channel for streaming media components. Although FIG. 1 depicts a streaming media transmission system, embodiments of the present invention can be used for many other types of resource allocation applications.

Figure 2:
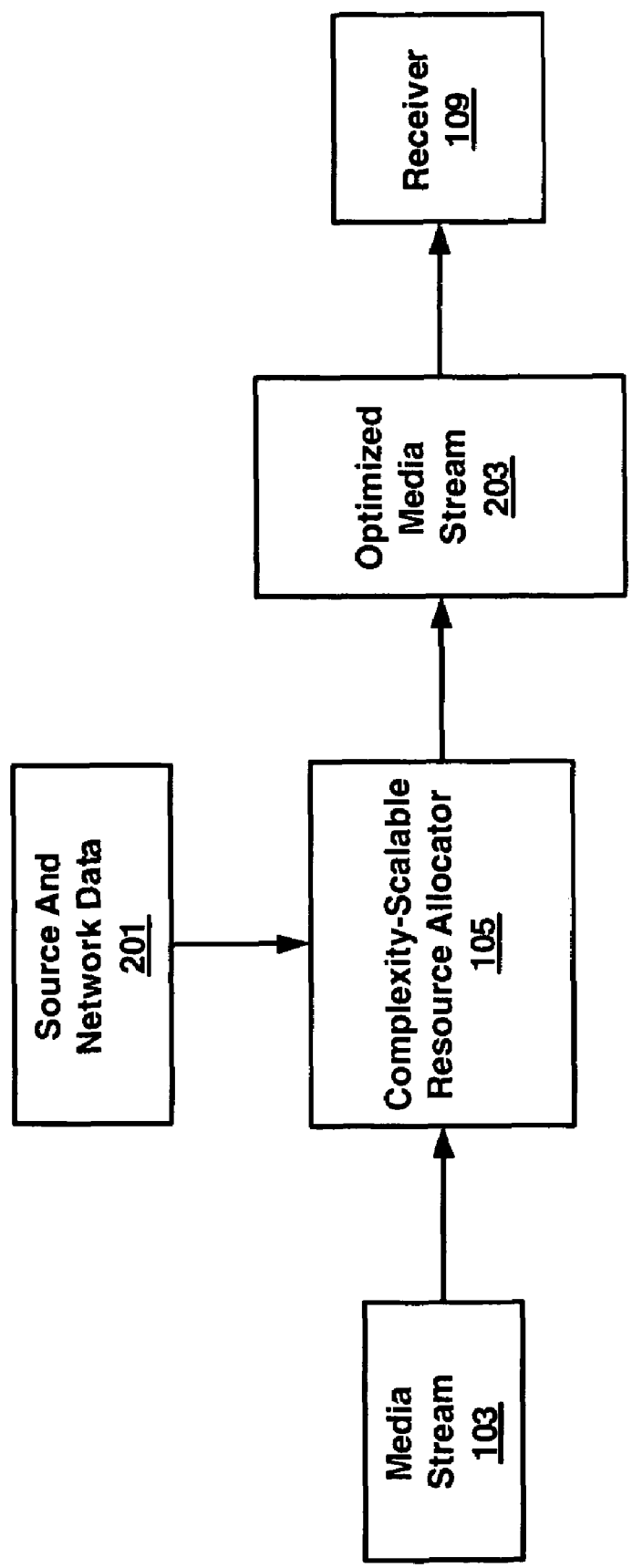
FIG. 2 shows a functional block diagram illustrating the relationship between functional blocks and data structures of the transmission system according to one embodiment of the present invention.

FIG. 2 shows a functional block diagram illustrating the relationship between functional blocks and data structures of a streaming media transmission system according to one embodiment of the present invention. FIG. 2 shows source and network data 201, media stream 103, complexity-scalable resource-allocator 105, optimized media stream 203, and receiver 109.

Referring to FIG. 2, the source and network data 201 that can be received by the complexity-scalable resource-allocator 105 can provide information from which source and channel characteristics can be ascertained. According to exemplary embodiments, this information provides the complexity-scalable resource-allocator 105 with the information that it can use to select the optimal manner in which to encode the media stream 103. Moreover, source and network data 201 provides the complexity-scalable resource-allocator 105 with the information that it can use to select the optimal network channel 107 over which to transmit the optimized media stream 203 to a receiver 109.

Exemplary source characteristics of a content source 101 can include characteristics (e.g., in the streaming video context) such as the type of reference frame encoding that is employed in a video encoding process. It should be appreciated that reference frame selection is an important step in the video encoding process. Moreover, it should be appreciated that the choice of reference frame affects both the error resilience (capacity to sustain errors in individual frames) of the resulting compressed video (e.g., see discussion made with reference to FIGS. 3A and 3B) and the resulting encoding bit rate of the motion predicted frame.

Exemplary network (e.g., channel) characteristics can include the number of channels involved, the rate and cost constraints of the involved channels, the quality of services that are offered, the reserved network resources involved and the physical properties (e.g., such as the distance from the transmitting base station) of the transmission medium, among other things, according to embodiments of the present invention. As previously mentioned, source and network characteristics enable the complexity-scalable resource-allocator 105 to determine how the raw media stream 103 is to be encoded and which channel is appropriate for transmission of the resultant media stream 203 to a receiver (e.g., 109).

Figure 3A:
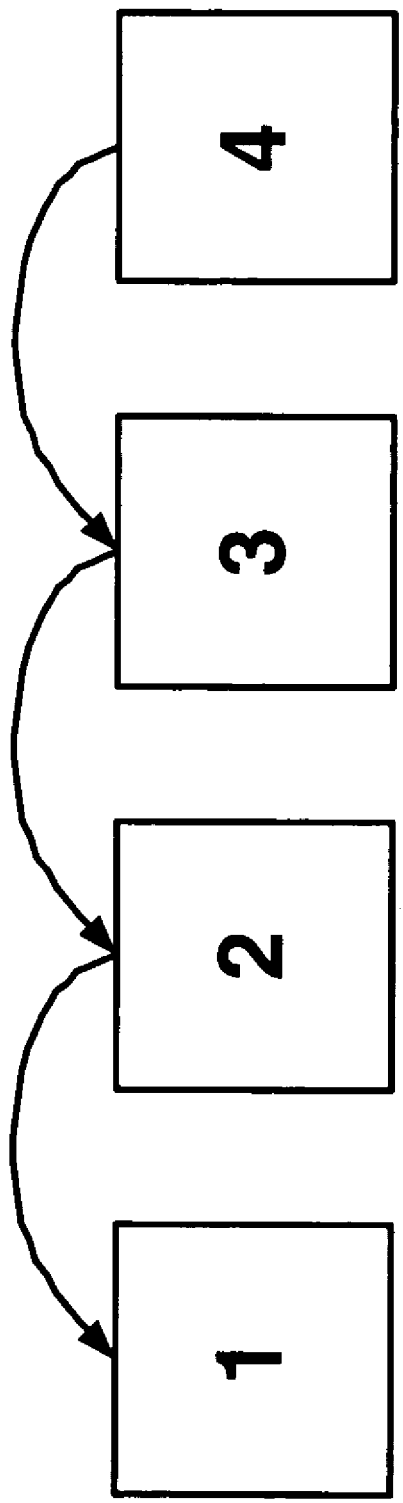
FIGS. 3A, 3B illustrate alternate types of video reference frame encoding according to one embodiment of the present invention.
Figure 3B:
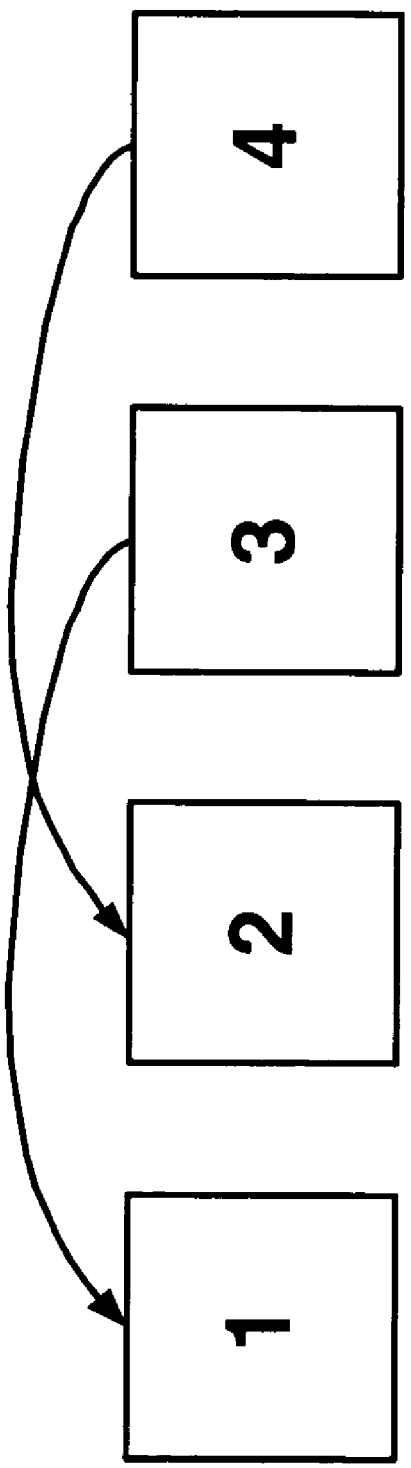

FIGS. 3A, 3B illustrate alternate choices of video reference frame selection. According to one embodiment, transmission source has the capacity to select from among a number of reference frames for motion prediction for a given frame. FIG. 3A illustrates the situation where every frame uses the previous frame as a reference. As previously discussed, the selection of the manner of video encoding that is employed has significant consequences. When a manner of video encoding is employed where every frame uses the previous frame as a reference, it should be appreciated that a single lost frame may cause all subsequent frames to be affected (i.e., low error resilience).

FIG. 3B illustrates the use of an odd-even numbered video frames as reference frames in a video encoding process. If odd numbered frames use a previous odd numbered frame as a reference, and even numbered frames use a previous even numbered frame as a reference, a single lost frame can affect at most half of the involved frames. This improvement in error resiliency over the encoding methodology discussed with reference to FIG. 3A may be accomplished with only a slight reduction in compression efficiency. It should be appreciated that many possible choices of references are possible. Exemplary embodiments of the present invention employ an algorithm that estimates the best frames to use (exploiting the flexibility of the transmission source to select any one of many frames) as the reference frames and selects the best channel over which to transmit the streaming media that encompasses the frames while reducing the number of calculations involved in estimating the best frames to use as reference frames and the best channel.

Figure 4:
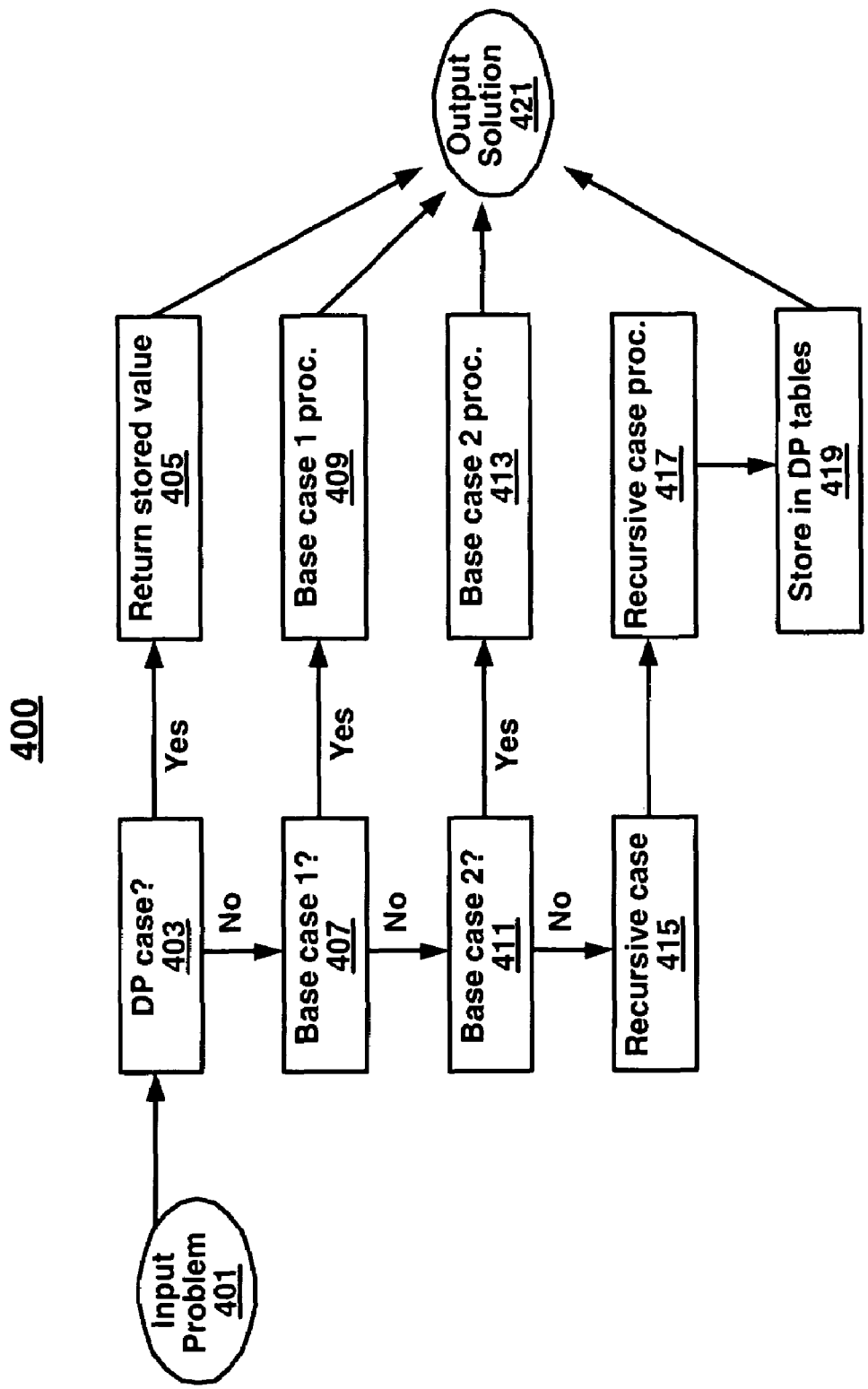
FIG. 4 is a flow diagram of exemplary operations of a video encoding optimizer that employs an algorithm that estimates the best frame to use as a reference frame and that selects the best channel over which to transmit the underlying streaming media according to one embodiment of the invention.

FIG. 4 is a flow diagram 400 of exemplary operations of a complexity-scalable resource-allocator that employs a dynamic programming algorithm that estimates the best frame to use as a reference frame and that identifies the best channel over which to transmit the underlying streaming media according while reducing the number of calculations involved in estimating the best frame and the best channel, according to one embodiment of the invention.

At step 401, input constraints (e.g., source and channel characteristics) are received by the complexity-scalable resource-allocator 105. Initially, the complexity-scalable resource-allocator 105 determines if the problem instance has been solved previously by accessing a table, such as a DP table as will become more evident, that contains solutions of previously solved problems. If it is determined that the problem instance has been previously solved at step 403, then the previously obtained solution is returned at step 405.

If at step 403 it is determined that the problem instance has not been previously solved, then a series of base cases are tested (e.g., 407 and 411). It should be appreciated that each of the base cases have a simplified search procedure (for optimal parameters) that is executed if the base case is applicable (e.g., 409 and 413).

If none of the base cases are applicable, at step 417 a recursive process can be utilized to determine how the raw media stream 103 is to be encoded and which channel 107 is appropriate for transmission of the resultant media stream to a receiver 109. According to one embodiment, the recursive process can be invoked for smaller problem instances before providing a solution. It should be appreciated that the solution can be recorded in a table of previously solved problems at step 419 before returning an output at step 421.

According to one embodiment, an important feature of the recursive process takes as input at least one non negative integer parameter. At each iteration of the procedure, the non negative integer parameter is decremented by at least a constant integer minimum amount. Consequently, the algorithm is guaranteed to finish in a finite number of steps.

Dynamic Programming Algorithm According To Embodiments Of The Present Invention

According to one embodiment of the present invention, an algorithm for selecting jointly optimal reference frames and transmission paths is provided. The algorithm is based on mathematical models of transmission components of a typical media transmission infrastructure, e.g., transmission source and network transmission paths. These models are developed and described below. The models are employed to generate an objective function that can describe as the number of correctly decoded frames that are transmitted to a receiver. Maximizing the number of correctly decoded frames at the receiver optimizes a transmission. According to one embodiment, the algorithm determines variables (e.g., selects values for variables that represent reference frame, network transmission path, etc.) that maximize the objective function and consequently indicate the optimal reference frame, transmission path selection for optimal transmission of streaming media content, among other things.

Source Model

Figure 5:
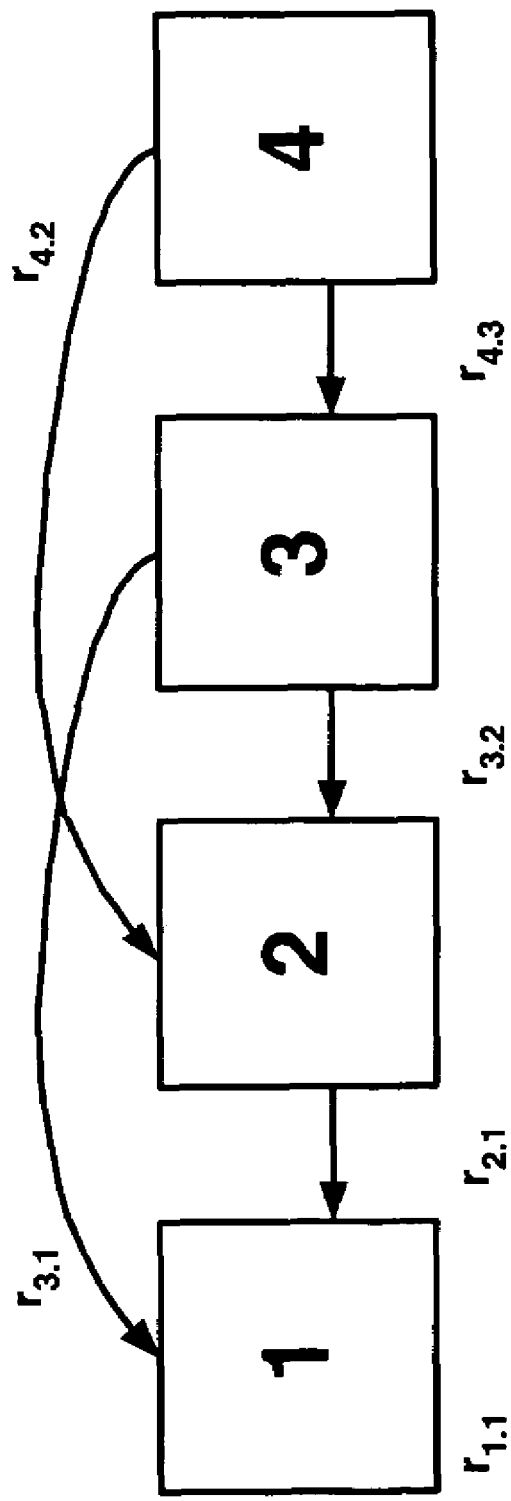
FIG. 5 depicts a directed acyclic graph (DAG) model of a four-frame sequence, according to one embodiment of the present invention.

FIG. 5 depicts a directed acyclic graph (DAG) model of a four-frame sequence, according to one embodiment of the present invention. According to one embodiment, decoding dependencies (reference frame dependencies) of the encoded media (transmitted streaming media) may be modeled using a directed acyclic graph (DAG) model G=(V, E) with vertex set V and edge set E. According to one embodiment, the streaming media is represented by a collection of frames, $F_i$, $i \in \{1, \ldots, M\}$. Each frame $F_i$, represented by a node i in V, has a set of outgoing edges $e_{i,j} \in E$ to nodes j's, representing the possible RFs (reference frames) $F_j$'s from which $F_i$ can choose. According to one embodiment a 0-1 variable $x_{i,j}$ can be designated to be 1 if $F_i$ uses $F_j$ as the RF (reference frame) as depicted below, according to one embodiment:

$$X_{i,j}=1 \text{ if } F_i \text{ uses } F_j \text{ as RF } V_j \in \{V | e_{i,j} \in E\} \quad (1)$$

$$X_{i,j}=0 \text{ otherwise}$$

Because each P-frame $F_i$ can only have one RF (reference frame), we have the following RF constraint, according to one embodiment:

$$\sum_{\{j|e_{i,j} \in \varepsilon\}} x_{i,j} = 1, \quad \forall_i \in v \quad (2)$$

According to one embodiment, a media stream is a sequence of frames. Frames that are earlier in the sequence can be used as references for subsequent frames, according to one embodiment. In addition, in this embodiment only frame one is intra-coded.

For the purpose of illustration, certain assumptions can be made. For example, assume that $r_{i,j}$, is an integer number of bytes in frame $F_i$ when frame $F_j$ is used as a reference frame. This is an approximation since the number of bytes depends not only on specific j chosen, but also the reference frame for frame $F_j$ as well, according to one embodiment. Denote the byte size of the starting I-frame by $r_{1,1}$. Further assume a sparse rate matrix r of size $O(M^2)$ is computed a priori as input to the complexity-scalable resource-allocator 105 (sparse because, for example, each row has at most $E_{max}$ entries). A discussion of how r is generated is discussed later herein.

Network Model

According to one embodiment, a network can provide a set of network services of varying quality (QOS), with each service being characterized by different packet loss rates. The differences in QOS can be attributable to network infrastructure (such as transmission path), or be application induced (such as resulting from the utilization of different strengths of application level forward error correction, FEC).

According to one embodiment, a QOS set Q={0, I. . . . Q} for streaming media transport is provided. According to this embodiment, a QOS level $q_i$, $q_i \in Q$ and a transmission path $t_i$ can be selected for each frame $F_i$. Moreover, $q_i=0$ denotes the case when $F_i$ is not transmitted at all.

For a given network condition, QOS level $q_i$, transmission path $t_i$, and frame size $r_{i,j}$, frame delivery success probability $p_{ti}(q_i, r_{i,j})$ can be determined, according to one embodiment. It should be appreciated that p( ) is dependent on $r_{i,j}$ because a large frame size can negatively impact the delivery success probability of the entire frame, according to one embodiment. This is because when large frames are encountered, it may be necessary to push more data through the network. It should be appreciated that the operation and the optimality of the herein described algorithm used for complexity-scalable resource-allocator 105, for example, is independent of how $p_{ti}(q_i, r_{i,j})$ is defined.

Network Resource Constraint

According to one embodiment, a constraint is imposed on the amount of resource that can be used in a streaming media transmission, which in one embodiment represents the aggregate ability to protect the M-frame sequence from network losses by the selection of QOS. Assume a QOS assignment $q_i$ results in a cost of $c(q_i)$ per byte, then the constraints for path 0 and path 1 are respectively as follows, according to one embodiment:

$$\sum_{i=1}^{M} \sum_{j|e_{i,j} \in \varepsilon} x_{i'j} c(q_i)(1-t_i) r_{i'j} \leq R_0 \quad (5)$$

$$\sum_{i=1}^{M} \sum_{j|e_{i,j} \in \varepsilon} x_{i'j} c(q_i) t_i r_{i'j} \leq R_1$$

According to one embodiment, the relation depicted in equation 5 above represents, a cost constraint in the case of network level QOS. It indicates that the total cost to the user per M-frame time should not exceed $R_0$ or $R_1$ units respectively. In the case of application-level QOS, the above relation represents a bit rate constraint per path, where $c(q_i)$ is the overhead in channel coding given QOS level $q_i$ and constraint parameters $R_0$ and $R_1$ can be obtained using a congestion control algorithm, so that the total output bits for M-frame time does not exceed $R_0$ and $R_1$ bytes, respectively.

It should be appreciated that the constraints depicted in equation 5 above can be a physical constraint, such as maximum rates of transmission channel, or a cost constraint, or a combination of constraints of different types (e.g., one constraint on cost, one on maximum number of bits, etc.).

Objective Function

An objective function is chosen to represent the expected number of correctly decoded frames at the decoder, according to one embodiment. Each frame $F_i$ is correctly decoded if and only if $F_i$ and all frames $F_j$'s it depends on are delivered drop-free. Mathematically, the objective function can be written as:

$$\max_{\{x_{i,j}\},\{q_i\}|\{t_i\}} \left\{ \sum_{i=1}^{M} \prod_{j \leq i} \sum_{\{k|e_{j,k} \in \varepsilon\}} x_{j,k} p_{tj}(q_i, r_{j,k}) \right\} \quad (6)$$

According to one embodiment, the objective is then: given pre-computed rate matrix r, delivery success probability function $p_{i,j}$ ($q_i$, $r_{i,j}$) and cost function $c(q_i)$, find variables $\{x_{i,j}\}$, $\{q_i\}$, and $\{t_i\}$ that maximize the result from equation 6 while satisfying the integer constraint (depicted in equation 1), the RF constraint (depicted in equation 2) and the network resource constraint (depicted in equation 5). According to one embodiment, this optimization may be defined as the RF/QOS/PATH selection problem.

Dynamic Programming Algorithim

FIG. 6 and FIG. 7 are components of an algorithm to compute the optimal resource allocation, according to one embodiment of the present invention. According to exemplary embodiments, a bounding technique can be used to trade off algorithm complexity with the quality of the resulting solution. An exemplary bounding technique is discussed below following the description of the algorithm components.

According to one embodiment, the optimization algorithm includes two recursive functions, called Sum (i, $R_0$, $R_1$) and Prod (j, i, $R_0$, $R_1$) and are illustrated in FIG. 6 and FIG. 7 respectively. Sum (i, $R_0$, $R_1$) returns the maximum sum of products (using equation 6, for example) for frames $F_1$ to $F_i$ given the availability of $R_0$ and $R_1$ network resource units. Prod (j, i, $R_0$, $R_1$) returns the inner product of sums term using equation 6 for $F_j$—probability that $F_j$ is decoded correctly—given $R_0$ and $R_1$ network resource units of path 0 and 1 are optimally distributed from F1 to $F_i$. A call to Sum(M, $R_0$, $R_1$) can yield the optimal solution. Pseudo-code for Sum (i, $R_0$, $R_1$) and Prod (j, i, $R_0$, $R_1$) are depicted in FIGS. 6 and 7 and descriptions are provided below. FIG. 4 depicts a flow diagram 400 that provides a high level description for the pseudo-code depicted in FIGS. 6 and 7.

Dissectine Sum(i, $R_0$, $R_1$)

Referring to FIG. 6, the recursive case (lines 10-19) can essentially test every combination of RF, QOS, and path for $F_i$ for the maximum sum. According to one embodiment, the result of this search is stored in the [i, $R_0$, $R_1$] entry of four dynamic programming (DP) tables, DPsum[], DPqos[], DPind [], and DPpath (line 20-21) that may be provided. It should be appreciated that DP tables are used so that if the same subproblem is called again, a previously computed result can be simply returned (line 1-2) as a solution.

According to one embodiment, the two base cases (line 3-9) can be invoked: i) when one or both of the resource constraints are violated, in which case $-\infty$ can be returned to signal the violation; and, ii) when the root node (I-frame) is reached. Because the root node has no RF to choose from, the search for an optimal solution (line 6-8) can be much simpler (e.g., optimal solution may be found without the need to find the optimal reference frame).

According to one embodiment, the complexity of Sum (M, $R_0$, $R_1$) can be bounded by the time required to construct a DP table of size M* $R_0$* $R_1$. To fill each entry in the DP table, the function Sum (i, $R_0$, $R_1$) can be called as is illustrated in FIG. 6, which has $O(E_{max} Q)$ operations to account for the two loops from lines 11-19 in the recursive case. Consequently, the complexity of function Sum (i, $R_0$, $R_1$) is given by $Q(M E_{max} Q R_0 R_1)$.

Dissecting Prod(j, i, $R_0$, $R_1$).

Referring now to FIG. 7, lines 13-14 of Prod(j, i, $R_0$, $R_1$) can be called after Sum(i, $R_0$, $R_1$) has been called, according to one embodiment. According to this embodiment, the entries (i, $R_0$, $R_1$) are available during execution of Prod(j, i, $R_0$, $R_1$).

According to one embodiment, the recursive case has two sub-cases: i) when j<I (lines 6-11), in which case there is a recursive invocation of Prod(j,i−1,.) given resource $c(X)r_{i,Y}$ is optimally used for node i; and ii) when j=I (lines 12-17), in which case the term i of product term—$p_0(X, r_{i,Y})$ for path 0 and $p_1$ (X, $r_{i,Y}$) for path 1—is known. The maximum product can be this product term (e.g., $p_0$ (X, $r_{i,Y}$) for path 0 and $P_1$ (X, $r_{i,Y}$) for path 1) times the recursive term Prod (Y, i−1, $R_0$-c(X) $r_{i,Y}$, $R_1$) if path 0 and Prod(Y, i−1, $R_0$, $R_1$ −c(X) $r_{i,Y}$) if path 1. The two base cases (lines 1-5) are similar to the two base cases for Sum (i, $R_0$, $R_1$), according to one embodiment.

DP Dimention Rounding

As noted above, the complexity of Sum (i, $R_0$, $R_1$) is O(M $E_{max}$ Q $R_0$ $R_1$), which is pseudo-polynomial. According to one embodiment, instead of solving the original RQP selection problem instance I for optimal solution s*, a modified problem instance I' for solution s'. Scaling down $R_0$ and $R_1$ can mean scaling down the dimension of the dynamic programming table, hence the complexity is reduced by a factor of $K^2_{DR}$ at the cost of decreasing solution quality, according to one embodiment. FIGS. 8A and 8B depict lines of pseudo-code that can be used for implementing DP index rounding by replacing lines 13-14 of Sum(i, $R_0$, $R_1$) with the lines depicted in FIG. 8A and replacing lines 8, 10, 14, 16 of Prod(j, i, $R_0$, $R_1$) with the lines depicted in FIG. 8B, according to one embodiment. Using Sum(i, $R_0$, $R_1$) and Prod(j, i, $R_0$, $R_1$) with the rewritten lines, the complexity I' is now $O(M\ E_{max}\ Q\ R_0\ R_1,\ K^{-2}_{DR})$ Consequently, the resulting network resource constraint relation is then given by the following, according to one embodiment:

$$\sum_{i=1}^{M} \sum_{\{j|ei,j \in E\}} x_{i',j}(1-t_i)\lceil c(q_i)r_{i,j}/K_{DR}\rceil \leq \lfloor R_0/K_{DR}\rfloor \quad (7)$$

$$\sum_{i=1}^{M} \sum_{\{j|ei,j \in E\}} x_{i',j}t_i\lceil c(q_i)r_{i,j}/K_{DR}\rceil \leq \lfloor R_t/K_{DR}\rfloor$$

The notation $\lceil y \rceil$ shall be used herein to indicate that a value y is rounded up to the nearest integer and the notation $\lfloor y \rfloor$ shall be used herein to indicate that a value y is rounded down to the nearest integer. It should be appreciated that, it can be easily shown that s' is feasible in I. Moreover, according to one embodiment, the performance difference between s' and s*, can be bounded by first obtaining a super-optimal solution s" in a new instance I", where the network resource constraint becomes, according to one embodiment:

$$\sum_{i=1}^{M} \sum_{\{j|ei,j \in E\}} x_{i',j}(1-t_i)\lceil c(q_i)r_{i,j}/K_{DR}\rceil \leq \lfloor R_0/K_{DR}\rfloor \quad (8)$$

$$\sum_{i=1}^{M} \sum_{\{j|ei,j \in E\}} x_{i',j}t_i\lceil c(q_i)r_{i,j}/K_{DR}\rceil \leq \lfloor R_t/K_{DR}\rfloor$$

After obtaining optimal solution s" to I", an approximate solution s' may be bound from the optimal s* in the original instance I as follows:

$$|obj(s^*)-obj(s')| \leq |obj(s'')-obj(s')| \quad (9)$$

where obj(s*) is the objective function using solution s*.

By pulling the cost term $c(q_i)$ inside of the rounding function, the cost term can be a real number and can be used to index DP tables. Further, by pulling the cost term $c(q_i)$ inside of the rounding function instead of leaving it outside of the rounding function results in a smaller round-off error.

DP Index Rounding

Instead of reducing the overall dimension of the dynamic programming table in order to scale down algorithmic complexity, another way is to limit the number of indices used in the DP table given the table's dimensions, hence the number of computations involved in computing constraints can be reduced, according to embodiments of the present invention. This rounding technique shall be referred to as DP index rounding, which can be accomplished by subtracting a positive integer multiple of $K_{IR} \in X$ from $R_0$ and $R_1$ during recursive calls to Sum(i, $R_0$, $R_1$) as depicted in FIG. 6. This can be accomplished by replacing $c(q_i)\ r_{i,j}$ with an approximate of $K_{IR}\lceil c(q_i)r_{i,j}/K_{IR}\rceil$. According to one embodiment, DP index rounding can be implemented by rewriting lines 13-14 of Sum(i, $R_0$, $R_1$) and lines 8, 10, 14, 16 of Prod(j, i, $R_0$, $R_1$) as depicted in FIGS. 8C, 8D respectively.

Figure 9:
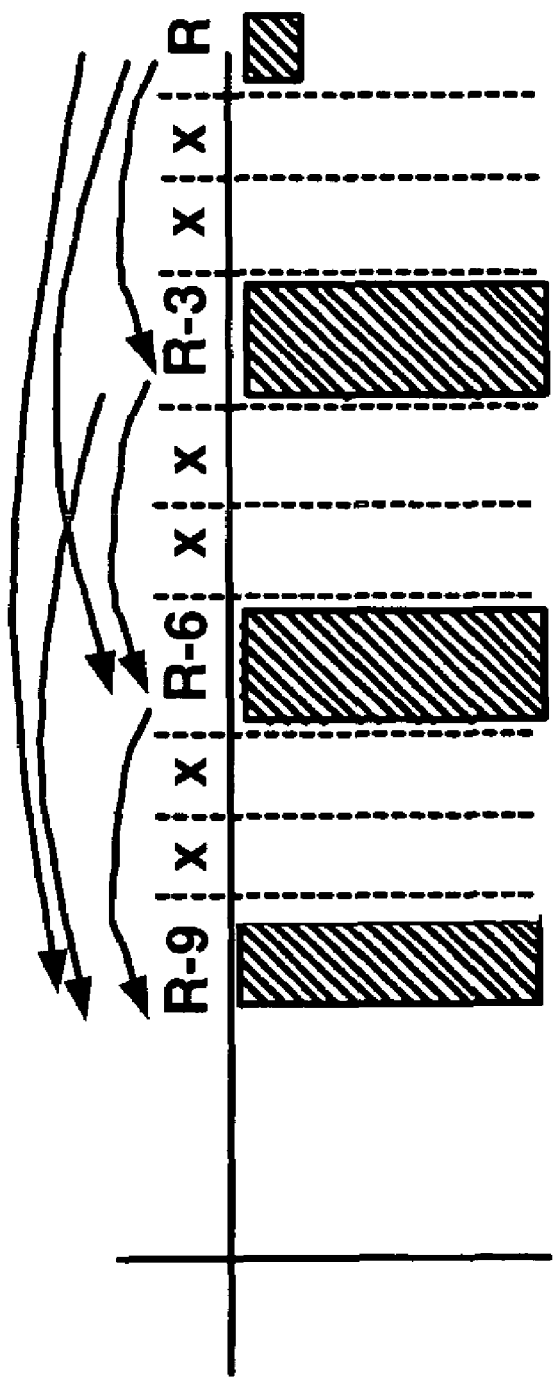
FIG. 9 depicts an illustration of DP index rounding with $K_{IR}=3$, according to one embodiment of the present invention.

FIG. 9 depicts an example of DP index rounding when $K_{IR}$=3, according to one embodiment. By recursing only on R less multiples of 3, only ⅓ of all of the indices are filled in a DP table along both the $R_0$ and $R_1$ dimensions. Hence, the new algorithmic complexity is $O(M\ E_{max}\ Q\ R_0\ R_1\ K^{-2}_{DR})$, according to one embodiment.

The new network constraints using DP index rounding are as follows, according to one embodiment:

$$\sum_{i=1}^{M} \sum_{\{j|ei,j \in E\}} x_{i',j}(1-t_i)K_{IR}\lceil (c(q_i)r_{i,j})/K_{IR}\rceil \leq R_0 \quad (10)$$

$$\sum_{i=1}^{M} \sum_{\{j|ei,j \in E\}} x_{i',j}t_iK_{IR}\lceil (c(q_i)r_{i,j})/K_{IR}\rceil \leq R_1$$

By using similar opposite rounding techniques, the performance of the approximate solution can be bound from the optimal by first constructing a super-optimal solution S" and evaluating the bound depicted in equation 9.

Comparing DP Index Rounding And DP Dimension Rounding To Rounding Performed By Some Conventional Art In some conventional art, only individual variables are rounded up or round. In contrast, according to embodiments of the present invention, DP Index-Rounding and DP Dimension Rounding perform rounding on mathematical functions of variables. For example, referring to equations 8 and 9, rounding is performed on mathematical functions that include the product of variables, such as c(q) and ri,j. In yet another example, if a constraint involves a mathematical function, such as $a*r+b*r^2$, the rounding can be applied to the entire mathematical function rather than to the terms $a*r$ and $b*r^2$ separately.

The rounding products of variables rather than individual variables has comparable complexity but can produce superior resource allocations. This is due to the fact that rounding of products introduces smaller error. For example, complexity reduction can be achieved by conservatively over-stating the actual resource (e.g, R0 and R1) consumption to the nearest multiple of K, as is the case in some conventional art. Further the use of rounding by the convention art can over-state the actual consumes resources, to a multiple of $K*c(q_i)$ for example, which can be overly conservative and can lead to inferior optimization results.

Combining DP Dimension Rounding With DP Index Rounding

According to one embodiment, both DP dimension rounding and index rounding can be used together, for example by replacing $R_0$ and $R_1$ respectively with $\lfloor R_0/K_{DR}\rfloor$ and $\lfloor R_1/K_{DR}\rfloor$ as input to the algorithm and replace $c(q_i)r_{i,j}$ with $K_{IR}\lceil c(q_i)r_{i,j}/K_{IR}\ K_{DR}\rceil[GCI]$ in line 13-14 of recursive function Sum (i, $R_0$, $R_1$) of FIG. 6 and lines 8, 10, 14 and 16 of Prod (j, i, $R_0$, $R_1$) of FIG. 7. According to one embodiment, the resulting network constraints are as depicted below, according to one embodiment:

$$\sum_{i=1}^{M} \sum_{\{j|ei,j \in E\}} x_{i',j}(1-t_i)K_{IR}\lceil (c(q_i)r_{i,j})/(K_{IR}K_{DR})\rceil \leq \lceil R_0/K_{DR}\rceil \quad (11)$$

-continued $$\sum_{i=1}^{M} \sum_{\{j|ei,j \in E\}} x_{i',j} t_i K_{IR} \lceil (c(q_i) r_{i,j})/(K_{IR} K_{DR}) \rceil \leq \lceil R_1/K_{DR} \rceil$$

The resulting complexity is $O(M\ E_{max}\ Q\ R_0\ R_1\ K^{-2}_{DR}\ K^{-2}_{DR})$, according to one embodiment. According to one embodiment, the extent of the error can be estimated by computing solution S' and super-optimal solution S" in order to directly relate the performance of the approximate solution S' to $K_{DR}$ and $K_{IR}$ analytically. To estimate the performance of the to-be-constructed approximate solution S' a priori given rounding factors $K_{DR}$ and $K_{IR}$, an alternate performance metric $\Omega_{err}$ can be used to track the maximum possible rounding error to occur when calculating network resource constraints using equation 11 instead of equation 5. In the worst case, according to one embodiment $\Omega_{err}$ is the maximum rounding error on the right side of equation 11 plus the maximum rounding error on the left side. Right maximum error is the maximum rounding error between $R_0$ and $R_1$, according to another embodiment. Left maximum error is the number of P-frames (M−1) times the maximum rounding error of $c(q_i)$ $r_{i,j}$, according to yet another embodiment.

$$\Omega_{err} = \max\{|R_0 - K_{dr}\lfloor R_0/K_{DR}\rfloor|, |R_1 - K_{dr}\lfloor R_1/K_{DR}\rfloor|\} + \quad (12)$$
$$(M-1) * \max_{q_i, r_{i,j}} |c(q_i)r_{i,j} - K_{IR}K_{DR}\lceil c(q_i)r_{i,j}/K_{IR}K_{DR}\rceil|$$
$$= K_{DR} - 1 + (M-1)(K_{IR}K_{DR} - 1)$$

The following equation 13 results from substituting $K_{IR}=K/K_{DR}$, according to one embodiment:

$$\Omega_{err} = K_{DR} - K(M-1) - M \quad (13)$$

Hence, $\Omega_{err}$ can be a linear increasing function of $K_{DR}$, i.e., provided $K_{IR}$ is set equal to K to minimize $\Omega_{err}$ for fixed K. Depending on implementation, a larger $K_{DR}$ can be used to reduce the amount of memory needed for the DP tables, each with a dimension of $O(M\ E_{max}\ Q\ R_0\ R_1\ K_{-2IR})$. So a practical rounding factor selection strategy to achieve a complexity scaling factor of $K^2$, $K=K_{DR}\ K_{IR}$ can be, according to one embodiment:

1) select the smallest $K_{DR} \in R$ for which sufficient memory can be allocated for the DP tables.
2) Given K and $K_{DR}$, calculate $K_{IR}:=\lceil K/K_{DR}\rceil$.

Experimental Results

Figure 10:
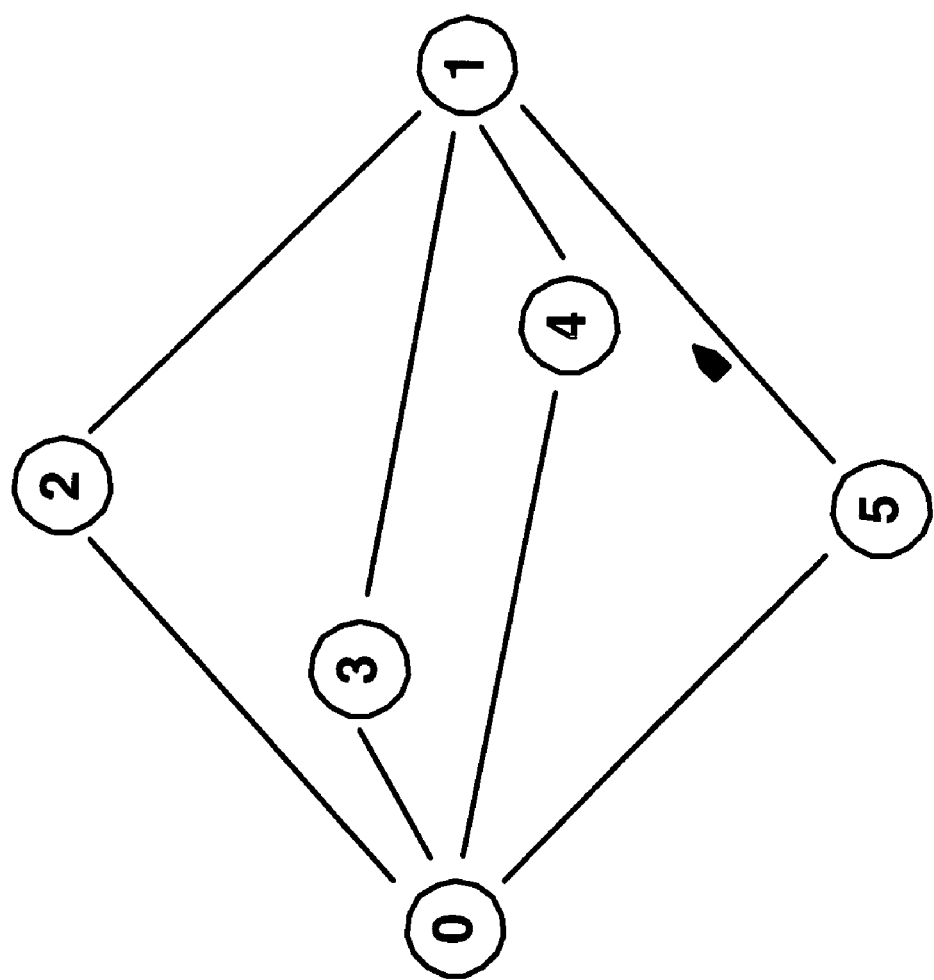
FIG. 10 depicts a network graph as a snap shot of a network animator (NAM), according to one embodiment of the present invention.

To test the optimization algorithms for DP index rounding and for the combination of DP dimension rounding and DP index rounding, an experimental testbed was built using network simulation 2 (ns2). Refer to "The network simulation ns-2," dated August 2003, release 2.26 at http://www.isi.edu/nsnam/ns/ for more information. For the network, a simple network graph, depicted in FIG. 10 as a snap shot of network animator (NAM) was used. A node was constructed for both the streaming server (node 0) and the client (node 1). To simulate different network path packet loss characteristics, four application-level forwarding agents (node 2-5) were constructed, simulating the role of application nodes in a content delivery network, whose sole purpose is to forward packets to the client upon packet arrival from the server. Different network packet losses were simulated using an independent loss model of varying loss parameter values on the links from the forwarding agents to the client. This resulted in four paths of different packet loss rates, according to one embodiment.

Levels of quality-of-service (QOS) were not implemented at the network layer in the experiment. Instead, the loss rate of the second path was manually set to be the effective packet loss rate if Reed-Solomon RS(3, 2) is used over a channel with raw packet loss rate of the first path. FEC schemes based on Reed-Solomon codes can correct as many losses as the number of redundancy packets according to P. Frossard and O. Verscheure, "Joint source/FEC rate selection for quality-optimal MPEG-2 video delivery," in IEEE trans. Image Processing, vol. 10, no. 12, December 2001, pp. 1815-1825. A combined rate constraint $R_0$ was manually enforced for both the first and second paths. This can be equivalent to a single virtual path with one constraint and two QOS classes. The same methodology was applied to the third and fourth path to create a second virtual path with rate constraint $R_1$ and two QOS classes. All experiments were performed using this two-virtual paths, two-QOS-level network graph.

Numerical Results

Figure 11:
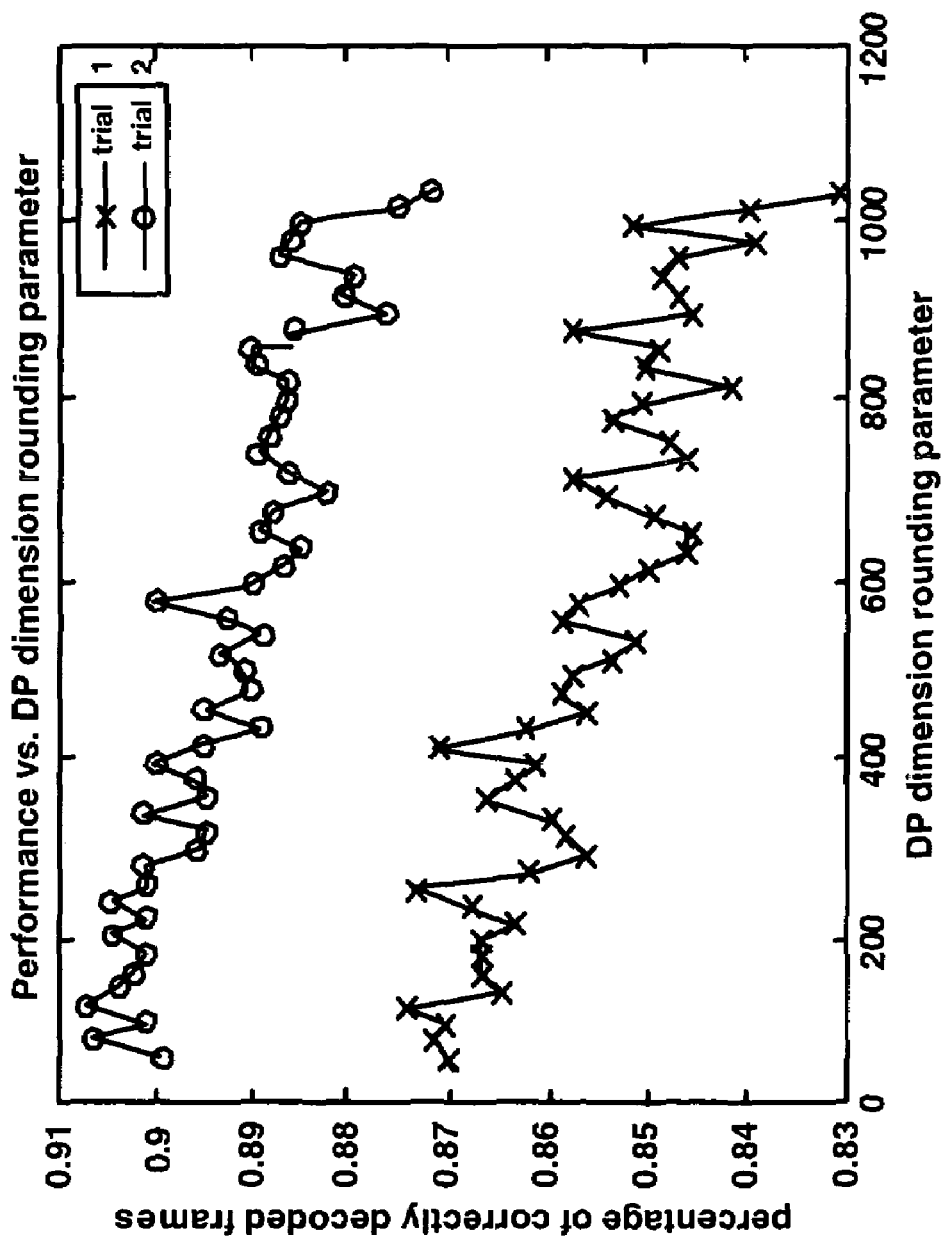
FIG. 11 depicts results from experiments using DP dimension rounding, according to embodiments of the present invention.

FIG. 11 depicts numerical results for an experiment using DP index rounding, according to one embodiment. In this experiment, the bandwidth of the two virtual paths $R_0$ and $R_1$ were held constant at 20 kilobytes per second (kbps) and 35 kbps respectively, DP index rounding parameter $K_{IR}$ was held constant at 1, and $K_{DR}$ was varied to observe the tradeoff between performance and complexity. Recall that the complexity of the optimization is $O(M\ E_{max}\ Q\ R_0\ R_1\ K^{-2}_{DR}\ K^{-2}_{IR})$ according to one embodiment. Two trials using different packet loss rates for the two virtual paths were performed: (0.06, 0.10) and (0.04, 0.08).

FIG. 11 shows that as the DP dimension rounding factor $K_{DR}$ increased, the quality of the solution decreased due to rounding and the performance decreased for both trials. Further FIG. 11 shows that the curves do not decrease in a strictly stepwise fashion. This can be attributed to the fact that rounding is a non-linear operation, according to one embodiment, meaning that the precise degree of the rounding error can depend on actual numbers $r_{i,j}$'s, $R_0$ and $R_1$ as well as $K_{DR}$. The general downward trend of the curves illustrates that performance is in general inversely proportional to the rounding factor $K_{DR}$, according to one embodiment, as already discussed herein.

Figure 12:
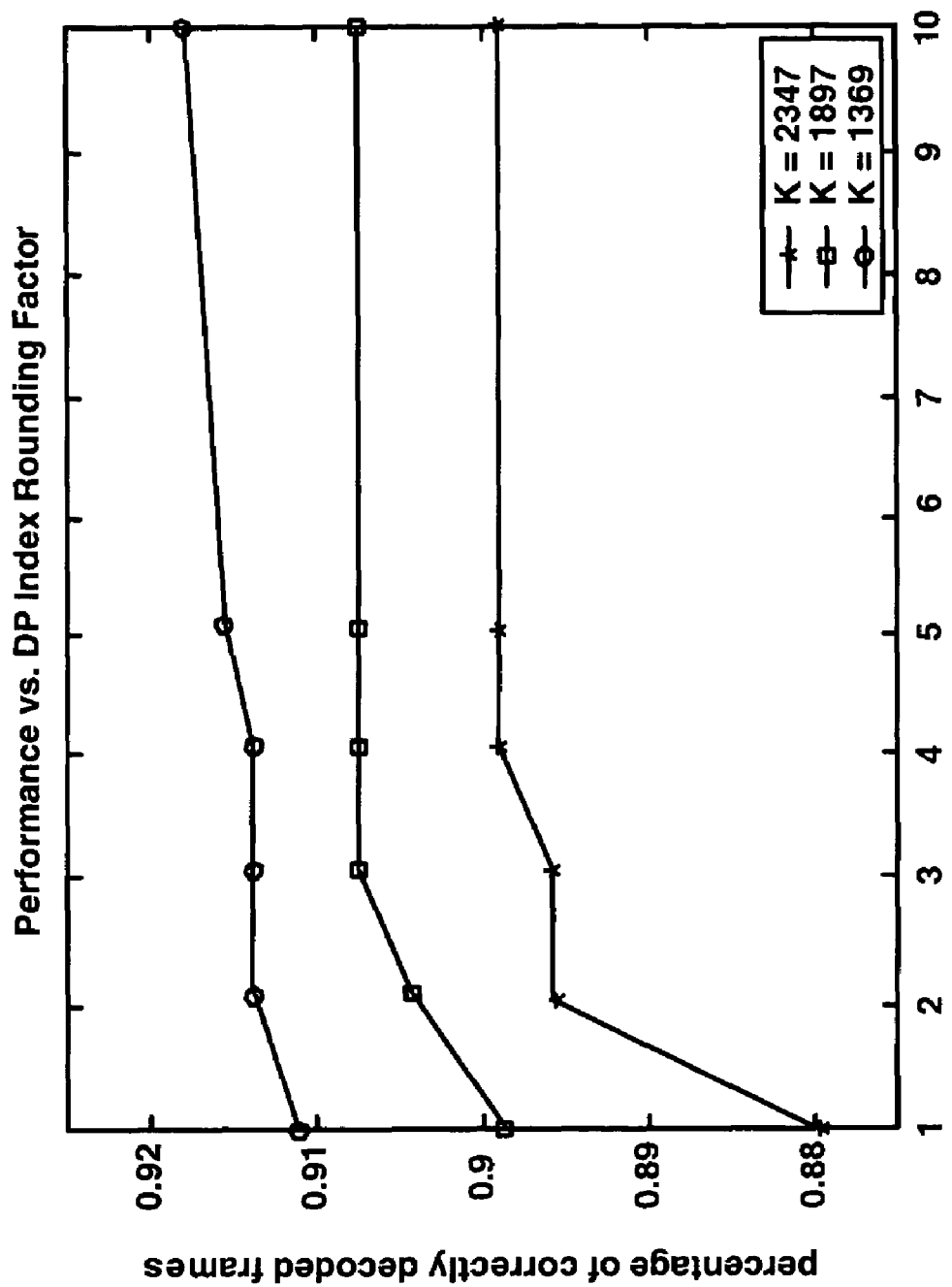
FIG. 12 depicts results from experiments using DP index rounding, according to embodiments of the present invention.

FIG. 12 depicts numerical results for an experiment using a combination of dimension rounding and DP index rounding, according to one embodiment. In this experiment, the merits of DP dimension rounding verses DP index rounding were explored. The loss rate and the bandwidth of the two virtual paths were held constant at (0.06, 0.1) and (30 kbps, 35 kbps) respectively. $K_{IR}$ was varied but the complexity reduction factor $K=K_{IR}*K_{DR}$ was held constant by adjusting $K_{DR}=K/K_{IR}$. Recall that, according to one embodiment, $K_{IR}$ is an integer while $K_{DR}$ is not required to be an integer. FIG. 12 depicts three different values of K.

As depicted in FIG. 12, as the complexity reduction factor K decreased, the performance curve correspondingly moved up—i.e., performance increased. This illustrates, as already described herein, that performance is inversely proportional to the complexity reduction factor, according to one embodiment. Further, in all three cases, as DP index rounding factor $K_{IR}$ increased for fixed K, the performance increased. This illustrates, as already described herein, that because $K_{IR}$ has a smaller maximum error than $K_{DR}$, in general it is better to use $K_{IR}$ as opposed to $K_{DR}$ to reduce complexity, according to one embodiment.

Exemplary Operations In Accordance With
Embodiments Of The Present Invention

Figure 13:
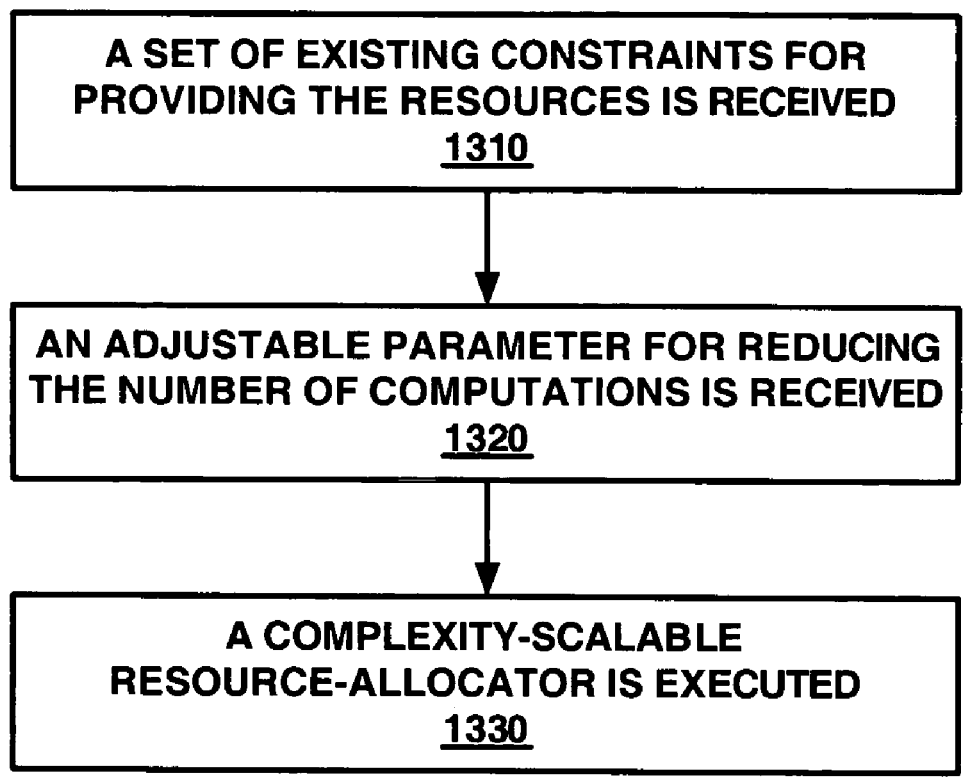
FIG. 13 depicts a flowchart for describing a method using DP index rounding to reduce the number of computations involved in computing constraints for an optimal allocation of resources, according to embodiments of the present invention.

FIG. 13 depicts a flowchart for describing a method using DP index rounding to reduce the number of computations involved in computing constraints for an optimal allocation of resources, according to embodiments of the present invention. The flowcharts include processes of the present invention which, in one embodiment, are carried out by processors and electrical components under the control of computer readable and computer executable instructions. The computer readable and computer executable instructions reside, for example, in data storage features such as computer usable volatile memory and/or computer usable non-volatile memory. However, the computer readable and computer executable instructions may reside in any type of computer readable medium. Although specific steps are disclosed in the flowcharts such steps are exemplary. That is, the present invention is well suited to performing various other steps or variations of the steps recited in FIG. 13. Within the present embodiment, it should be appreciated that the steps of the flowcharts may be performed by software, by hardware or by any combination of software and hardware.

At step 1310, a set of existing constraints for providing the resources is received. An example of a resource is a frame associated with streaming media 103 that can be transmitted over various channels. Different constraints may be associated with each of the channels 107. For example, the companies that provide transmission of streaming media 103 over the channels 107 may charge (e.g., cost) for the transmission. Further, the users of receiver 109, which pay for the transmission may have a budget that they are willing to spend for the transmission. The cost and the budget are examples of constraints.

More specifically, the context source 101 can receive resources, such as the frames of media streams 103, as well as existing constraints, such as the cost $c(q_i)$ associated with providing the media stream 103 to a receiver 109 and budgets $R_0$, $R_1$, for providing the media stream 103 for respective channels 1 and 2 (107).

At step 1320, an adjustable parameter for reducing the number of computations is received. For example, the content source 101 can receive an adjustable parameter, such as $K_{IR}$.

At step 1330, a complexity-scalable resource-allocator is executed. For example, the complexity-scalable optimizer 105 can be implemented using pseudo-code depicted in FIGS. 6 and 7 with lines 13 and 14 of Sum (i, $R_0$, $R_1$) replaced with the lines depicted in FIG. 8C and the lines 8, 10, 14, 16 of Prod (j, i, $R_0$, $R_1$) replaced with the lines depicted in FIG. 8D. The complexity-scalable optimizer 105 can receive existing constraints $c(q_i)$, $R_0$, $R_1$ and the adjustable parameter $K_{IR}$ among other things, from the content source 101 and use the constraints and the adjustable parameter to compute an estimated constraint by dividing an existing constraint, such as $c(q_i)$ with the adjustable parameter, $K_{IR}$, rounding down, and multiplying by the adjustable parameter, $K_{IR}$, resulting in an estimated constraint based on a portion (e.g., $K_{IR}\lceil c(q_i)/K_{IR}\rceil$ [$_{GC2}$]) of the equation 10, according to one embodiment. According to another embodiment, the cost of providing a resource (e.g., $c(q_i)$) can be multiplied by the size of a resource, such as the number of bytes of a frame (e.g., $r_{i,j}$), prior to dividing the existing constraint $c(q_i)$ with the adjustable parameter, $K_{IR}$, resulting in an estimated constraint based on a different portion (e.g., $K_{IR}\lceil c(q_i)r_{i,j}/K_{IR}\rceil$[$_{GC3}$]) of equation 10.

Exemplary embodiments of the present invention employ an algorithm (such as that depicted in FIGS. 6 and 7 with lines 13 and 14 of Sum (i, $R_0$, $R_1$) replaced with the lines depicted in FIG. 8C and the lines 8, 10, 14, 16 of Prod (j, i, $R_0$, $R_1$) replaced with the lines depicted in FIG. 8D) that can be used to estimate the best frames to use (exploiting the flexibility of the transmission source to select any one of many frames) as the reference frames and selects the best channel over which to transmit the streaming media that encompasses the frames while reducing the number of calculations involved in estimating the best frames to use as reference frames and the best channel.

According to embodiments of the present invention, the complexity-scalable resource-allocator 105 (implemented as described under either the "DP Index Rounding" or "Combining DP Dimension Rounding with DP Index Rounding-"sections) offers simultaneous bound on the quality of the obtained approximate solution and bound on the complexity of the optimization algorithm and the quality of the obtained approximate solution can be traded off with the bounded complexity of the optimization. The implementation described under the "DP Index Rounding" section provides a better quality solution than conventional methods, according to one embodiment, but may result in a higher use of memory. The implementation described under the "Combining DP Dimension Rounding with DP Index Rounding" section provides a technique that can be used to trade off quality verses memory usage, according to one embodiment.

Embodiments of the present invention provide optimal transport of video stream over networks with multiple qualities of service (QOS) or multiple transmission paths for real-time playback. For networks with multiple qualities of service, there is a combined cost constraint for each transmission moment. For multiple transmission paths (multi-paths), each path is individually rate constrained. Note that one rate or cost-constrained path streaming is the base case described herein with reference to FIGS. 4, 6 and 7. A network may have multiple qualities of service if the network service provider has implemented and can provide differentiated services.

A network provides multiple transmission paths, for example, if a wireless client can simultaneously communicate with two nearby base stations. In such cases, because the reserved network resources and physical properties such as distance from the transmitting base-station for each link are different, the transmission paths will very likely have different packet loss rates and bandwidth constraints. For rate-constrained multi-path networks, exemplary embodiments can utilize separate transmission paths that are simultaneously available and that have heterogeneous characteristics for streaming media transmissions.

Embodiments of the present invention provide a solution for delay-jitter sensitive applications. An application is delay sensitive if it cannot tolerate end-to-end packet retransmission. A source of sensitivity in some transmission topologies is the presence of a small initial playback buffer that is employed at the client side. The large transmission delay of wireless links such as 3G cellular links can cause any packet retransmitted upon client request to miss its playback deadline and hence be rendered useless. In such cases, exemplary embodiments select the correct transmission path for each frame, subject to the rate constraints of the individual paths.

The video coding technique of exemplary embodiments is one with flexible motion-estimation support, where each P-frame can have selected any frame among a number of frames for motion estimation. It should be appreciated that at the cost of coding efficiency, using a frame further in the past for motion estimation can potentially avoid error propagation due to packet loss. Given a particular streaming media scenario and a chosen video coding standard, exemplary embodiments find a jointly optimal selection of reference frame and transmission path for optimal performance.

Although many of the embodiments of the present invention are described herein in the context of streaming media, the embodiments of the present invention can be used for many different types of resource allocation problems where constraints are associated with the allocation of the resources. For example, according to embodiments of the present invention, new algorithms were described to solve a special class of resource allocation problems. Resource allocation problems can pertain to one or more pools of resources that need to be distributed to a set of competing users requesting the resource, such that the overall performance of all users are maximized.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for controlling the number of computations involved in computing the allocation of delay-jitter sensitive resources given resource constraints, the method comprising:
   receiving a set of existing constraints for providing the delay-jitter sensitive resources over a plurality of wireless communication channels;
   receiving an adjustable parameter for reducing the number of computations associated with providing said delay-jitter sensitive resources without jitter or delay, said adjustable parameter associated with a cost of coding and associated with a coding efficiency wherein said adjustable parameter is selected based on said existing constraints and selected to provide said delay-jitter sensitive resources without jitter or delay over said wireless channels; and
   executing a complexity-scalable resource-allocator that computes an estimated constraint for providing a resource, at least in part, by dividing the existing constraint by the adjustable parameter, rounding up or down, and multiplying by the adjustable parameter, wherein the estimated constraint is used to optimally allocate the resources with reduced jitter and delay according to said existing constraints.

2. The method of claim 1, further comprising:
   transmitting the resource over a path that is selected based on the estimated constraint generated from the execution of the complexity-scalable optimization.

3. The method of claim 2, wherein the executing the complexity-scalable optimization further comprises:
   computing the estimated constraint, at least in part, based on a previously transmitted resource.

4. The method of claim 1, wherein the receiving the set of existing constraints for providing the resources further comprises:
   receiving the set of existing constraints for providing video frames.

5. The method of claim 1, wherein the executing the complexity-scalable optimization further comprises:
   executing the complexity-scalable optimization recursively for all combinations of resources, paths for transmitting the resources, and duality of service levels associated with the paths.

6. The method of claim 5, the method further comprising:
   storing the estimated constraint in a table so that the estimated constraint can be retrieved to avoid re-computing the same estimated constraint for future invocations of the complexity-scalable resource-allocator.

7. The method of claim 1, wherein the receiving the set of existing constraints for providing the resources further comprises:
   receiving the existing constraint that is a cost for transmitting the resource over a path given a quality of service level.

8. The method of claim 1, wherein the step of executing the complexity-scalable optimization further comprises:
   computing an index that is based on dimension rounding and index rounding.

9. The method of claim 1, wherein the rounding up or down is performed on mathematical expressions that include one or more existing constraints.

10. A content source that enables controlling the number of computations involved in computing the allocation of delay-jitter sensitive resources given resource constraints, the content source comprising:
    memory for
       storing a set of existing constraints for providing the delay-jitter sensitive resources over a plurality of wireless communication channels; and
       storing an adjustable parameter for reducing the number of computations associated with providing said delay-jitter sensitive resources without jitter or delay, said adjustable parameter associated with a cost of coding and associated with a coding efficiency wherein said adjustable parameter is selected based on said existing constraints and selected to provide said delay-sensitive resources without jitter or delay over said wireless channels;
    a processor coupled to the memory for
       receiving the set of existing constraints;
       receiving the adjustable parameter; and
       executing a complexity-scalable resource-allocator that computes an estimated constraint for providing a resource, at least in part, by dividing an existing constraint for providing the resource by the adjustable parameter, rounding down, and multiplying by the adjustable parameter, wherein the estimated constraint is used to optimally allocate the resources with reduced jitter and delay according to said existing constraints.

11. The content source of claim 10, wherein the content source transmits the resource over a path that is selected based on the estimated constraint generated from the execution of the complexity-scalable optimization.

12. The content source of claim 11, wherein the executing the complexity-scalable optimization computes the estimated constraint, at least in part, based on a previously transmitted resource.

13. The content source of claim 10, wherein the content source receives the set of existing constraints for providing video frames.

14. The content source of claim 10, wherein the complexity-scalable resource-allocator executes the complexity-scalable optimization recursively for all combinations of resources, paths for transmitting the resources, and quality of service levels associated with the paths.

15. The content source of claim 14, wherein the content source stores the estimated constraint in a table so that the estimated constraint can be retrieved to avoid re-computing the same estimated constraint for future invocations of the complexity-scalable optimization.

16. The content source of claim 10, wherein the content source receives the existing constraint that is a cost for transmitting the resource over a path given a quality of service level.

17. The content source of claim 10, wherein the complexity-scalable optimization computes an index that is based on dimension rounding and index rounding.

18. A computer-usable medium having computer-readable program code embodied therein for causing a computer system to perform a method for controlling the number of computations involved in computing the allocation of delay-jitter sensitive resources given resource constraints, the method comprising:
receiving a set of existing constraints for providing the delay-jitter sensitive resources over a plurality of wireless communication channels;
receiving an adjustable parameter for reducing the number of computations associated with providing said delay-jitter sensitive resources without jitter or delay over said wireless channels, said adjustable parameter associated with a cost of coding and associated with a coding efficiency wherein said adjustable parameter is selected based on said existing constraints and selected to provide said delay-jitter sensitive resources without jitter or delay; and
executing a complexity-scalable optimization that computes an estimated constraint for providing a resource, at least in part, by dividing the existing constraint by the adjustable parameter, rounding down, and multiplying by the adjustable parameter, wherein the estimated constraint is used to optimally allocate the resources with reduced jitter and delay according to said existing constraints.

19. The computer-usable medium of claim 18, wherein the computer-readable program code embodied therein causes a computer system to perform the method, and wherein the method further comprising:
transmitting the resource over a path that is selected based on the estimated constraint generated from the execution of the complexity-scalable optimization.

20. The computer-usable medium of claim 19, wherein the computer-readable program code embodied therein causes a computer system to perform the method, and wherein the executing the complexity-scalable optimization further comprises:
computing the estimated constraint, at least in part, based on a previously transmitted resource.

21. The computer-usable medium of claim 18, wherein the computer-readable program code embodied therein causes a computer system to perform the method, and wherein the receiving the set of existing constraints for providing the resources further comprises:
receiving the set of existing constraints for providing video frames.

22. The computer-usable medium of claim 18, wherein the computer-readable program code embodied therein causes a computer system to perform the method, and wherein the executing the complexity-scalable optimization further comprises:
executing the complexity-scalable optimization recursively for all combinations of resources, paths for transmitting the resources, and quality of service levels associated with the paths.

23. The computer-usable medium of claim 22, wherein the computer-readable program code embodied therein causes a computer system to perform the method, and wherein the method further comprising:
storing the estimated constraint in a table so that the estimated constraint can be retrieved to avoid re-computing the same estimated constraint for future invocations of the complexity-scalable optimization.

24. The computer-usable medium of claim 18, wherein the computer-readable program code embodied therein causes a computer system to perform the method, and wherein the receiving the set of existing constraints for providing the resources further comprises:
receiving the existing constraint that is a cost for transmitting the resource over a path given a quality of service level.

25. The computer-usable medium of claim 18, wherein the computer-readable program code embodied therein causes a computer system to perform the method, and wherein the step of executing the complexity-scalable optimization further comprises:
computing an index that is based on dimension rounding and index rounding.

* * * * *

UNITED STATES PATENT AND TRADEMARK OFFICE
CERTIFICATE OF CORRECTION

PATENT NO. : 7,406,053 B2
APPLICATION NO. : 11/011938
DATED : July 29, 2008
INVENTOR(S) : Gene Cheung et al.

It is certified that error appears in the above-identified patent and that said Letters Patent is hereby corrected as shown below:

In column 9, line 51, delete "$p_{i,j}$" and insert -- $p_{ti}$ --, therefor.

In column 11, line 22, delete "[y]" and insert -- $\lceil y \rceil$ --, therefor.

In column 11, line 23, delete "[y]" and insert -- $\lfloor y \rfloor$ --, therefor.

In column 13, line 43, delete "$K_{-2IR}$" and insert -- $K^{-2}_{IR}$ --, therefor.

In column 18, line 7, in Claim 5, delete "duality" and insert -- quality --, therefor.

In column 19, line 21, in Claim 18, delete "delay-jifter" and insert -- delay-jitter --, therefor.

Signed and Sealed this

Thirtieth Day of June, 2009

JOHN DOLL
*Acting Director of the United States Patent and Trademark Office*